US011225130B2

(12) United States Patent
Kurachi et al.

(10) Patent No.: US 11,225,130 B2
(45) Date of Patent: Jan. 18, 2022

(54) ROOF WEATHER STRIP

(71) Applicant: TOYODA GOSEI CO., LTD., Kiyosu (JP)

(72) Inventors: Ayumi Kurachi, Kiyosu (JP); Ikuo Ninomiya, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 79 days.

(21) Appl. No.: 16/815,552

(22) Filed: Mar. 11, 2020

(65) Prior Publication Data
US 2020/0307365 A1   Oct. 1, 2020

(51) Int. Cl.
*E06B 7/22* (2006.01)
*B60J 10/90* (2016.01)
*B60J 10/246* (2016.01)
*B60J 10/27* (2016.01)

(52) U.S. Cl.
CPC ............ *B60J 10/90* (2016.02); *B60J 10/246* (2016.02); *B60J 10/27* (2016.02)

(58) Field of Classification Search
CPC . B60J 10/90; B60J 10/246; B60J 10/27; B60J 10/82; B60J 10/33
USPC ........... 49/498.1, 490.1; 296/206.01, 220.01, 296/216.04, 216.06, 216.07, 216.09
See application file for complete search history.

(56) References Cited

U.S. PATENT DOCUMENTS

| | | | | |
|---|---|---|---|---|
| 5,383,991 A * | 1/1995 | Brocke | ..................... | B60J 10/82 156/108 |
| 5,779,301 A * | 7/1998 | Ito | ........................... | B60J 10/82 296/217 |
| 6,099,779 A * | 8/2000 | Brandner | .................. | B60J 10/82 264/242 |
| 6,286,898 B1 * | 9/2001 | Mori | ........................ | B60J 10/82 296/216.09 |
| 2001/0033097 A1 * | 10/2001 | Nozaki | .................. | B60J 10/235 296/216.09 |
| 2005/0081451 A1 * | 4/2005 | Tamura | ..................... | B60J 10/24 49/490.1 |
| 2009/0001772 A1 * | 1/2009 | Dosaki | ..................... | B60J 10/16 296/216.09 |
| 2012/0248826 A1 * | 10/2012 | Motomura | ............... | B60J 10/24 296/216.07 |
| 2013/0160375 A1 * | 6/2013 | Kuwabara | .............. | B60J 10/235 49/490.1 |

(Continued)

FOREIGN PATENT DOCUMENTS

| | | |
|---|---|---|
| JP | 2014-136456 A | 7/2014 |
| JP | 2015-058746 A | 3/2015 |
| JP | 6268841 B2 | 1/2018 |

*Primary Examiner* — Jerry E Redman
(74) *Attorney, Agent, or Firm* — Posz Law Group, PLC

(57) ABSTRACT

A roof weather strip includes a first panel and a second panel, and integrally includes: a mounting base; and a seal portion elastically contactable with an edge portion of the first panel. The mounting base includes: a first lip having a substantially J-shaped cross section, which covers an upper fitting protrusion of a holder portion from above a vehicle, extends downward of the vehicle, and abuts on at least both side surfaces of a fitting recess of the holder portion; and a second lip having a substantially transverse v-shaped cross section, which covers a lower fitting protrusion of the holder portion from below the vehicle, extends upward of the vehicle, and abuts on at least one of a lower surface of the fitting recess of the holder portion and a side surface of the lower fitting protrusion on the second panel side.

3 Claims, 4 Drawing Sheets

(56) References Cited

U.S. PATENT DOCUMENTS

| | | | |
|---|---|---|---|
| 2014/0197665 A1* | 7/2014 | Fukami | B60J 10/24 296/216.09 |
| 2015/0076868 A1* | 3/2015 | Sawada | B60J 10/40 296/216.06 |
| 2015/0183309 A1* | 7/2015 | Koshimichi | B60J 10/40 296/216.09 |
| 2016/0272055 A1* | 9/2016 | Fujiwara | B60J 10/82 |
| 2016/0288634 A1* | 10/2016 | Sawada | B60J 10/82 |
| 2017/0015184 A1* | 1/2017 | Sawada | B60J 10/90 |
| 2017/0182870 A1* | 6/2017 | Takahashi | B60J 7/22 |
| 2017/0246939 A1* | 8/2017 | Dosaki | B60J 10/27 |
| 2018/0111465 A1* | 4/2018 | Hall | B60J 7/0435 |
| 2018/0298678 A1* | 10/2018 | Amagai | E06B 7/2309 |
| 2019/0084394 A1* | 3/2019 | Coria | B60J 10/84 |
| 2020/0023723 A1* | 1/2020 | Ferguson | B60J 10/70 |
| 2020/0307365 A1* | 10/2020 | Kurachi | B60J 10/27 |
| 2021/0129648 A1* | 5/2021 | Ortmueller | B60J 10/18 |

* cited by examiner

FRONT ←→ REAR

FRONT ←→ REAR

ROOF WEATHER STRIP

CROSS-REFERENCE TO RELATED APPLICATION(S)

This application is based upon and claims the benefit of priority from prior Japanese patent application No. 2019-057973 filed on Mar. 26, 2019, the entire contents of which are incorporated herein by reference.

BACKGROUND

1. Field of the Invention

The present invention relates to a roof weather strip which is mounted on a fixed panel and seals a space between end portions of panels that can be opened and closed in a vehicle including the panels that can be opened and closed on a roof and an opening portion having the fixed panel.

2. Description of the Related Art

It is known that JP-A-2015-58746 discloses, for example, a roof weather strip which is mounted on a fixed panel and seals a space between end portions of panels that can be opened and closed in a vehicle including the panels that can be opened and closed on a roof and an opening portion having the fixed panel. As shown in FIG. 6, a holder portion 310 is protruded on a movable panel 200 side of a fixed panel 300, and the holder portion 310 includes a fixed panel edge portion 320 for fitting a boundary weather strip (roof weather strip) 500 and a panel side engaging projection 330 having a substantially hook-shaped cross section from a lower side portion at a front end edge of the fixed panel edge portion 320 toward the front of the vehicle. That is, the holder portion 310 includes a fitting recess 340 in a direction of the movable panel 200, which is constricted in a vehicle height direction, and a protruded fitting protrusion 350 on an upper side of the vehicle connected to the fitting recess 340.

Further, the boundary weather strip (roof weather strip) 500 includes an mounting base 510 having a substantially hook-shaped cross section so as to be engaged with the panel side engagement projection 330 of holder portion 310 alternately, that is, abut on the fitting recess 340 and the fitting protrusion 350, and a seal portion 520 that curves to the front of the vehicle from the mounting base 510. The mounting base 510 is made of a solid material of synthetic rubber such as EPDM or a thermoplastic elastomer, and the seal portion 520 is made of a sponge material of synthetic rubber such as EPDM or a thermoplastic elastomer.

When the movable panel 200 is closed, the seal portion 520 of the boundary weather strip (roof weather strip) 500 bends to abut on a movable panel edge portion 210 on the fixed panel 300 side of the movable panel 200, and seals a space between the holder portion 310 of the fixed panel 300 and the movable panel edge portion 210 of the movable panel 200.

On the other hand, it is known that JP-A-2014-136456 discloses, for example, a mounting structure of a weather strip mounted on a panel body provided in an opening portion of a vehicle roof, which is not a vehicle having a plurality of panels as described above. It is an object of JP-A-2014-136456 to prevent tearing off of the weather strip due to injection of high-pressure washing liquid from above a roof during high-pressure washing.

As shown in FIG. 7, the panel body provided in the opening portion of the vehicle roof includes a holder portion 610 joined to an outer peripheral edge portion of the panel body for fitting the weather strip 600, and a fitting recess 620 constricted in a vehicle vertical direction, and a fitting protrusion 630 including an upper fitting protrusion 641 and a lower fitting protrusion 642 which protrude in the vehicle vertical direction is formed in the holder portion 610.

Further, the weather strip 600 includes an mounting base 640 made of solid rubber, and a seal portion 650 made of sponge rubber elastically contactable with an opening portion edge portion 110 of a vehicle roof 100. The mounting base 640 is formed with a body portion 660 connected to an outer surface of the fitting protrusion 630 of the holder portion 610, a substantially claw-shaped (block-shaped) upper mounting portion 670 which is connected to an upper end of the body portion 660, climbs over the upper fitting protrusion 641 of the holder portion 610 from an upper side of the vehicle, and is protruded toward the fitting recess 620, and a substantially claw-shaped (block-shaped) lower mounting portion 671 which is connected to a lower end of the body portion 660, climbs over the lower fitting protrusion 642 of the holder portion 610 from a vehicle bottom, and is protruded toward the fitting recess 620. Further, an extension portion 680 extending obliquely downward and outward from a lower end outer portion of the lower mounting portion 671 is formed in the mounting base 640.

On the other hand, the seal portion 650 is formed to have a substantially arcuate cross section, is placed on an upper surface of the mounting base 640, and is joined to the extension portion 680 at a lower end thereof. A hollow portion 651 having a substantially D-shaped cross section is formed between the seal portion 650 and an outer side surface of the mounting base 640. Further, the seal portion 650 has a substantially tongue-shaped lip portion 690 protruding to a vehicle inner side more than an upper surface of the mounting base 640, and elastically contacts an upper surface of the holder portion 610 in the lip portion 690.

However, in FIG. 6, when a state in which the opening of the roof is closed over a long period (a state in which the movable panel 200 is closed for a long period) lasts, the movable panel edge portion 210 formed of a resin material and the seal portion 520 of the boundary weather strip (roof weather strip) 500 are fixed to an end portion of the movable panel 200 on the fixed panel 300 side, and when the movable panel 200 is opened again, there has arisen a problem that the boundary weather strip (roof weather strip) 500 is detached from the holder portion 310 protruding to the movable panel 200 side of the fixed panel 300, and the movable panel 200 is not closed.

In this case, when a holding force of the boundary weather strip (roof weather strip) 500 is increased, a thickness of the mounting base 510 of the boundary weather strip (roof weather strip) 500 increases, and a weight thereof increases.

Further, if a technique of JP-A-2014-136456 is applied, it is considered that a problem that the boundary weather strip (roof weather strip) 500 in JP-A-2015-58746 is detached from the holder portion 310 protruding to the movable panel 200 side of the fixed panel 300 can be solved, but a weight of the weather strip 600 increases since the upper mounting portion 670 and the lower mounting portion 671 have a substantially claw-shaped block shape in a shape of the mounting base 640 as shown in FIG. 7. A large force is made necessary to attach the upper mounting portion 670 of the mounting base 640 to the fitting recess 620 of the holder portion 610, and then attach the lower mounting portion 671 of the mounting base 640 to the fitting recess 620 by climbing over the lower fitting protrusion 642 of the holder portion 610, and assemblability is poor.

SUMMARY

According to a first aspect of the present invention, there is provided a roof weather strip including: a first panel; and a second panel, wherein: the first panel is configured to be possible to open and close a opening portion of a vehicle roof; the second panel is disposed adjacent to a vehicle rear side or front side of the first panel and is fixed in a state of blocking the opening portion; a holder portion is formed on an end portion of the second panel on the first panel side; the holder portion is formed with a fitting recess in a direction of the first panel side, which is constricted in a vehicle height direction, and a fitting protrusion connected to the fitting recess, which includes an upper fitting protrusion and a lower fitting protrusion protruding in a vehicle vertical direction; the roof weather strip is mounted to the holder portion and seals a space between the holder portion and the first panel by inserting the upper fitting protrusion and the lower fitting protrusion of the holder portion in the vehicle height direction; the roof weather strip integrally includes: a mounting base; and a seal portion elastically contactable with an edge portion of the first panel; the mounting base includes: a first lip having a substantially J-shaped cross section, which covers the upper fitting protrusion of the holder portion from above the vehicle, extends downward of the vehicle, and abuts on at least both side surfaces of the fitting recess of the holder portion; and a second lip having a substantially transverse v-shaped cross section, which covers the lower fitting protrusion of the holder portion from below the vehicle, extends upward of the vehicle, and abuts on at least one of a lower surface of the fitting recess of the holder portion and a side surface of the lower fitting protrusion on the second panel side.

In the first aspect, the mounting base of the roof weather strip is formed with a first lip having a substantially J-shaped cross section, which covers the upper fitting protrusion of the holder portion from above the vehicle, extends downward of the vehicle, and abuts on at least both side surfaces of the fitting recess of the holder portion, so that both side surfaces of the fitting recess of the holder portion are pressed by an abutment reaction force thereof when the first lip abuts on the fitting recess of the holder portion.

Further, the mounting base of the roof weather strip is formed with a second lip having a substantially transverse v-shaped cross section, which covers the lower fitting protrusion of the holder portion from below the vehicle, extends upward of the vehicle, and abuts on at least one of a lower surface of the fitting recess of the holder portion and a side surface of the lower fitting protrusion on the second panel side. Therefore, the second lip abuts on a surface of the lower fitting protrusion of the holder portion on the vehicle lower side, and when engaged with the fitting recess, the tip part strongly abuts on at least one of a lower surface of the holder and the side surface of the lower fitting protrusion on the second panel side.

As a result, by a high frictional force of the first lip with both side surfaces of the fitting recess of the holder portion, a strong abutting force of the second lip to at least one of the lower surface of the holder and the side surface of the lower fitting protrusion on the second panel side, and the like, and their synergistic effects, the mounting base of the roof weather strip is firmly fixed to the holder portion against a fixing force with the first lip even though the seal portion of the roof weather strip is pulled upward when the first panel opens upward, so that the roof weather strip can be prevented from disconnection.

Further, since the cross section of the first lip is formed in a substantially J-shape and the cross section of the second lip is formed in a substantially transverse v shape, the two lip are bent to climb over and abut on the fitting protrusion of the holder portion and can be engaged with the fitting recess, so that it is easy to attach the roof weather strip to the holder portion and has extremely high workability.

Further, since both of the first lip and the second lip have a lip shape, the weight of the roof weather strip will not be increased.

Here, the substantially J-shape of the cross section of the first lip refers to a shape extending upward in which a tip part of a longitudinal rod portion once extending downward is folded back into an arc shape on the left side, and the substantially transverse v shape of the cross section of the second lip refers to a shape extending obliquely upward from below the mounting base toward the second panel side in which the tip part extending obliquely upward is folded back toward the first panel side.

According to a second aspect of the present invention, in the first aspect, a downward extension length of the first lip is set longer than an upward extension length of the second lip. In the second aspect, since the downward extension length of the first lip is set longer than the upward extension length of the second lip, when the second lip having a substantially transverse v-shaped cross section formed on the mounting base is caused to climb over the lower fitting protrusion of the holder portion and is attached, the tip part of the second lip is extended large, that is, it is not necessary to increase the tip part of the second lip to be large, that is, it is not necessary to increase an angle of the v shape, and the assemblability is excellent.

According to a third aspect of the present invention, in the first aspect of the second aspect, a recess is formed on at least one of an upper end portion and a lower end portion of a surface abutting on a side surface of the fitting protrusion of the holder portion on the first panel side in the mounting base.

In the third aspect, since the recess is formed on at least one of the upper end portion and the lower end portion of the surface abutting on the side surface of the fitting protrusion of the holder portion on the first panel side in the mounting base, a dimensional error between the upper fitting protrusion and lower fitting protrusion of the holder portion and the mounting base of the roof weather strip can be absorbed, and the roof weather strip can be certainly attached to the holder portion. Along with this, the assemblability is good.

According to the aspects of the present invention, since the mounting base of the roof weather strip is formed with the first lip having a substantially J-shaped cross section, which covers the upper fitting protrusion of the holder portion from above the vehicle and abuts on the upper surface of the fitting recess of the holder portion, and a second lip having a substantially transverse v-shaped cross section, which covers the lower fitting protrusion of the holder portion from below the vehicle and abuts on the lower surface of the fitting recess of the holder portion, by a high frictional force of the first lip with both side surfaces of the fitting recess of the holder portion, a strong abutting force of the second lip to at least one of the lower surface of the holder portion and the side surface of the lower fitting protrusion below the vehicle on the first panel side, and the like, and their synergistic effects, the mounting base of the roof weather strip is firmly fixed to the holder portion against a fixing force with the first lip even though the roof weather strip is pulled upward when the first panel opens upward again, and the roof weather strip can be prevented from disconnection.

Further, since the cross section of the first lip is formed in a substantially J-shape and the cross section of the second lip is formed in a substantially transverse v shape, the two lip are bent to climb over and abut on the fitting protrusion of the holder portion and can abut on the fitting recess, so that it is easy to attach the roof weather strip to the holder portion and has excellent assemblability.

Further, since both of the first lip and the second lip have a lip shape, the weight of the roof weather strip will not be increased.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
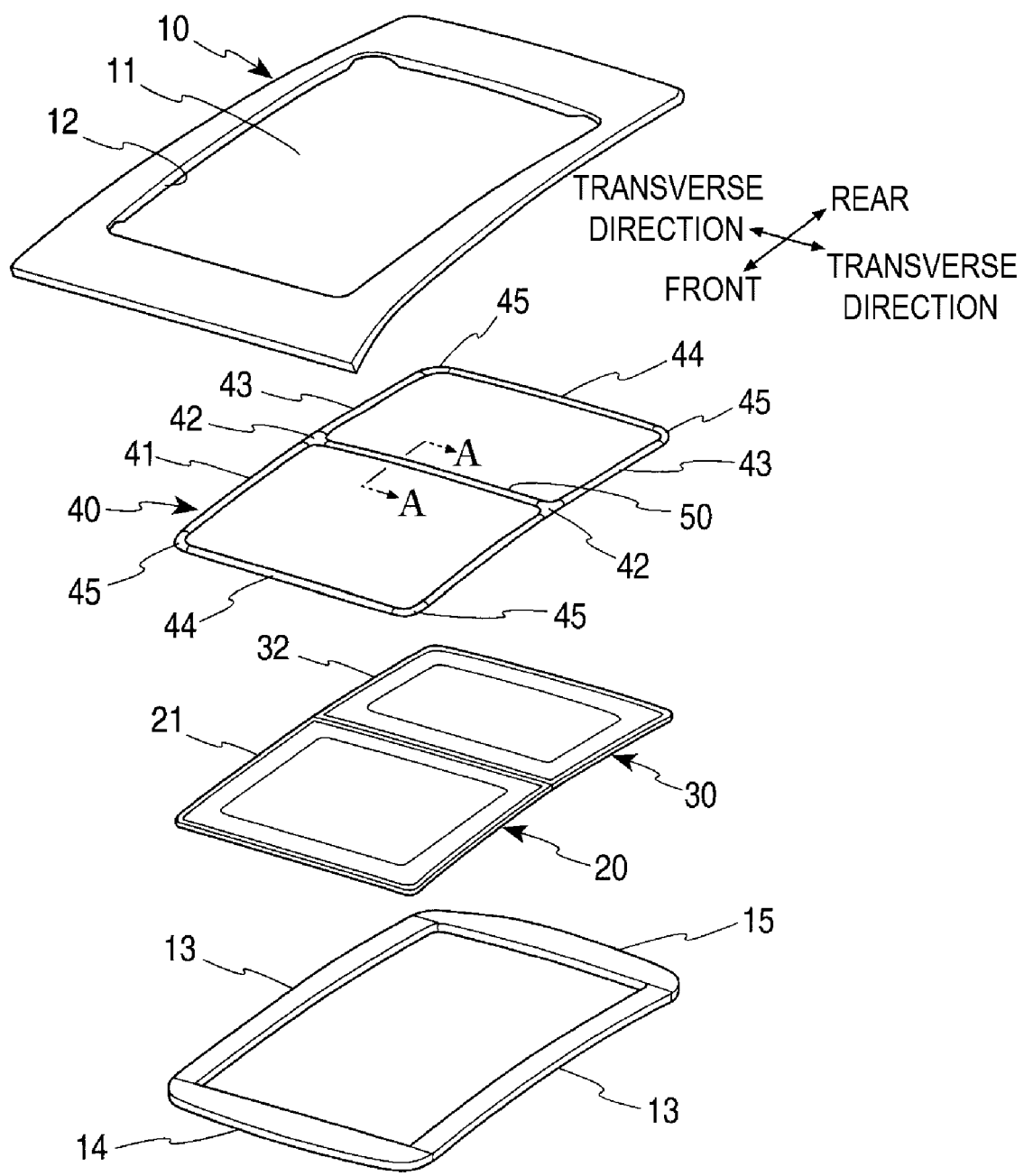
FIG. 1 is an exploded perspective view of a roof portion of a vehicle according to an embodiment of the present invention.
Figure 2:
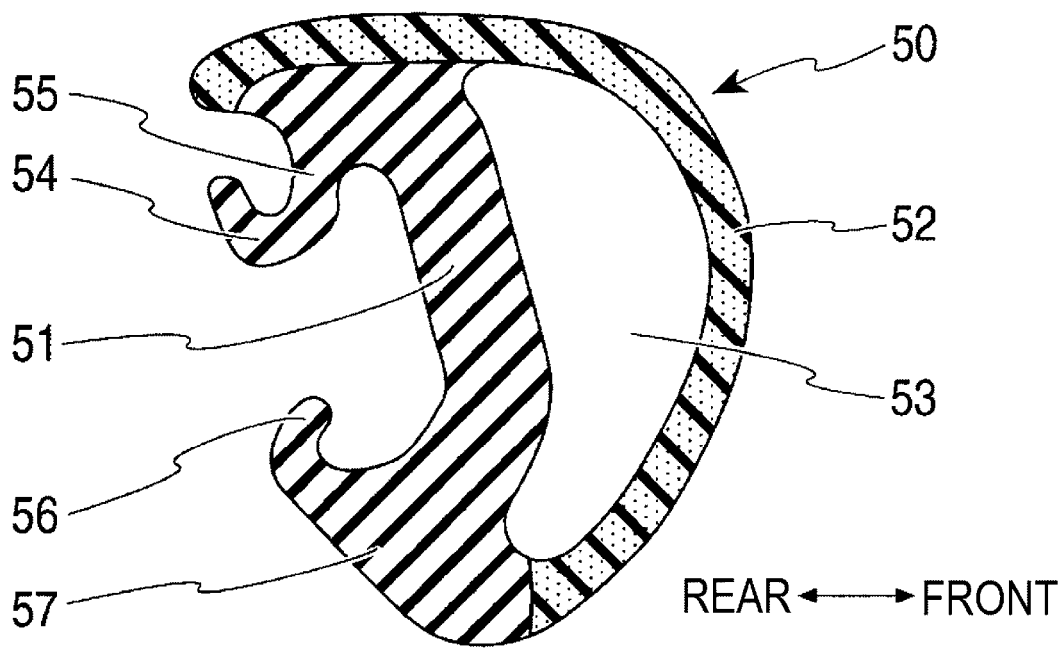
FIG. 2 is a cross-sectional view of a roof weather strip according to a first embodiment of the present invention.
Figure 3:
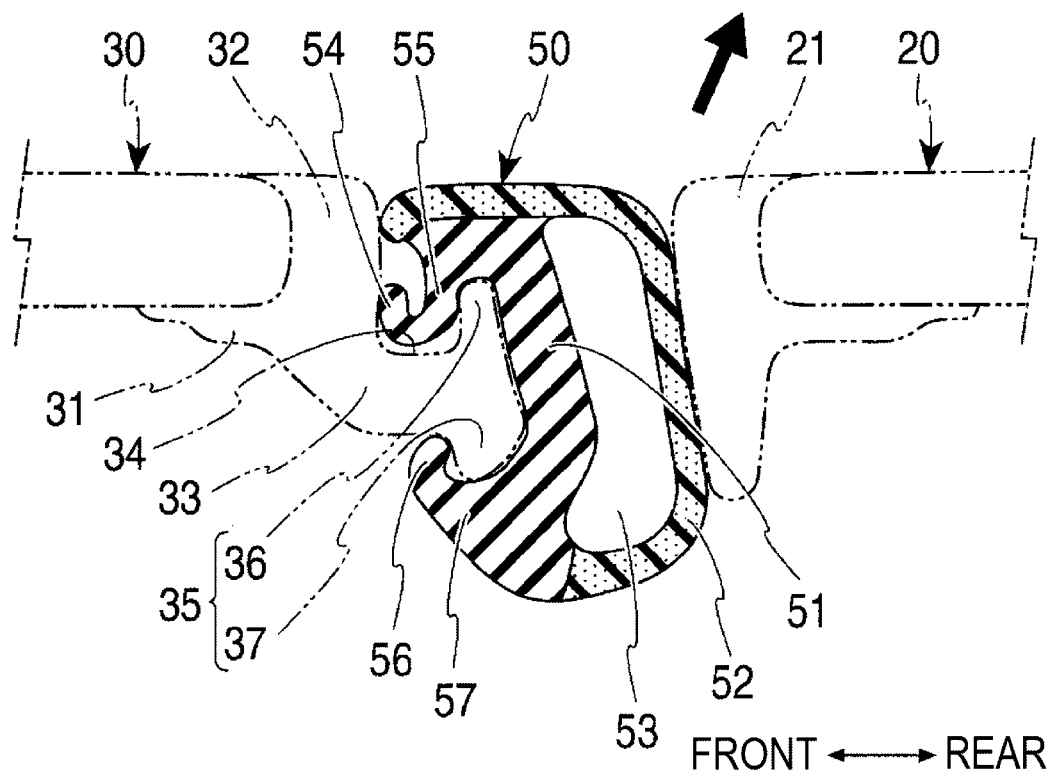
FIG. 3 is a cross-sectional view of a cross section A-A of the roof weather strip of FIG. 1 when the roof weather strip according to the first embodiment of the present invention is attached to the roof.

A first embodiment of the present invention is described based on FIG. 1 to FIG. 3. Hereinafter, a front-rear direction of a vehicle is referred to as a "front-rear direction", and an upper side and a lower side in a height direction of the vehicle are referred to as an "upper side" and a "lower side" respectively. A width direction of the vehicle is referred to as a "width direction".

As shown in FIG. 1, a substantially quadrilateral opening 11 is formed on a roof 10 of a vehicle, such as an automobile. An opening edge of the opening 11 includes a substantially quadrilateral tubular body one-side flange portion 12 which extends downward over a substantially entire periphery of the opening 11. In the roof 10, a first panel 20 which is a substantially quadrilateral movable panel and a second panel 30 which is a fixed panel, which are made of, for example, a glass plate, are installed in parallel in the front-rear direction. The first panel 20 is mounted to open and close a front portion of the opening 11. That is, the first panel 20 is mounted to perform a tilt-up operation in which a rear side part of the first panel 20 rises with a front side part of the first panel 20 as a fulcrum and a sliding operation in the front-rear direction. In the opening/closing work of the front portion of the opening 11 due to the first panel 20, a so-called outer sliding type which slides in a tilt-up state is employed. The first panel 20 includes a substantially quadrilateral annular first panel edge portion 21 made of a polyurethane resin material along a peripheral edge portion thereof. The resin material of the first panel edge portion 21 is not limited to polyurethane.

On the other hand, the second panel 30 is mounted to obstruct a rear portion of the opening 11. The second panel 30 includes a substantially quadrilateral annular first panel edge portion 32 made of, for example, a resin material along a peripheral edge portion thereof.

A pair of guide rails 13 extending in the front-rear direction respectively along both edge portions of the opening 11 in a width direction are installed on the roof 10. Further, a front housing 14 which extends along a front edge portion of the opening 11 and connects front ends of the two guide rails 13 in the width direction is installed on the roof 10, and a rear housing 15 which extends along a rear edge portion of the opening 11 and connects rear ends of the two guide rails 13 in the width direction is installed on the roof 10. Each of the guide rails 13 is made of an extruded material, for example, aluminum alloy, and a front housing 14 and a rear housing 15 are made of, for example, a resin material.

In addition, a pair of functional components (not shown) are respectively supported by the two guide rails 13 to be movable in the front-rear direction. The first panel 20 is connected to and supported by the two functional components in a state of being bridged therebetween. The first panel 20 opens and closes along with movement of the two functional components in the front-rear direction.

A weather strip 40 is installed on the roof 10. The weather strip 40 has a substantially quadrilateral annular weather strip body 41 along a peripheral portion of the opening 11, a roof weather strip 50 extending in the width direction along a front edge portion of the second panel 30, and a connecting portion 42 formed in a type that integrally connects the weather strip body 41 and both ends of the roof weather strip 50 in the width direction.

The weather strip body 41 includes a pair of side weather strips 43 which extend respectively in the front-rear direction along both edge portions of the opening 11 in the width direction and a pair of front and rear weather strips 44 which extend respectively in the width direction along both edge portions of the opening 11 in the front-rear direction. A front end and a rear end of each of the side weather strips 43 are respectively connected to tips of the pair of side weather strips 43 via die-formed corner portions 45, respectively.

Each of the side weather strips 43 is made of an extruded material having a substantially constant cross section in the front-rear direction, and both of the front and rear weather strips 44 and the roof weather strip 50 are made of an extruded material having a substantially constant cross section in the width direction. The present invention relates to a roof weather strip 50.

As shown in FIG. 2, the roof weather strip 50 includes the mounting base 51 and a seal portion 52 having a substantially arcuate cross section that is elastically contactable with the first panel edge portion 21 of the first panel 20. A hollow portion 53 having a substantially D-shaped cross section is formed between the seal portion 52 and an outer side surface of the mounting base 51.

The mounting base 51 covers an upper fitting protrusion 36 of a holder portion 31 of the second panel 30 to be described later from above the vehicle, and a cross section extending toward the fitting recess 34 is substantially J-shaped, that is, a first lip 54 having a shape extending upward is formed by folding back a tip part of a longitudinal rod portion 55 once extending downward into an arc shape on the left side. A tip part of the first lip 54 has a tapered shape.

a lower fitting protrusion 37 of the holder portion 31 is covered from below the vehicle, and a cross section protruded toward a lower surface of the fitting recess 34 is substantially transverse v-shaped, that is, a second lip 56 having a shape extending obliquely upward is formed toward the second panel 30 side from below the mounting base 51 in which a tip part extending obliquely upward is folded back toward the first panel side. A lower part 57 of the second lip 56 is formed to have a thickness.

In the roof weather strip 50, the mounting base 51, the first lip 54, and the second lip 56 are solid materials of EPDM (ethylene propylene diene rubber), and the seal portion 52 is formed by extrusion molding using a sponge material of EPDM.

FIG. 3 is a cross-sectional view in the vicinity of the roof weather strip 50 when the roof weather strip is attached to the roof 10. The holder portion 31 is protruded on a side of the first panel 20 which is a movable panel of the second panel 30 which is a fixed panel, and the holder portion 31 includes a second panel edge portion 32 for fitting the roof weather strip 50 and a first panel side engaging projection 33 having a substantially hook-shaped cross section from a lower side portion at the second panel edge portion 32 toward the front of the vehicle. That is, the holder portion 31 includes a fitting recess 34 in a direction of the first panel 20, which is constricted in a vehicle height direction, and a fitting protrusion 35 connected to the fitting recess 34, which includes the upper fitting protrusion 36 and the lower fitting protrusion 37 protruding in the vehicle vertical direction. The fitting protrusion 35 of the holder portion 31 is formed to have a thickness below, a side surface on the first panel 20 side faces upward and is inclined to the second panel 30 side.

In order to mount the roof weather strip 50 to the holder portion 31 of the second panel 30, first, the first lip 54 having a substantially J-shaped cross section formed in the mounting base 51 is inserted into the fitting recess 34 of the holder portion 31. Since the substantially J-shaped first lip 54 is deformed and inserted into the fitting recess 34 by abutting on both side surfaces of the fitting recess 34, the first lip 54 can be easily inserted and mounted into the fitting recess 34. Further, when the mounting is completed, the first lip 54 abuts on both side surfaces of the fitting recess 34 to be fixed, so that the first lip 54 can be firmly fixed to the fitting recess 34 by a reaction force by the abutting. The first lip 54 may be inserted deep into the fitting recess 34 and may abut on a bottom surface of the fitting recess 34.

Next, the second lip 56 having a substantially transverse v-shaped cross section is caused to climb over the lower fitting protrusion 37 of the holder portion 31. At this time, since the cross section of the second lip 56 is formed in a substantially transverse v shape, the tip part can be easily extended, that is, an angle of v can be increased, and the tip part of the second lip 56 can be easily climbed over. Further, since the lower part 57 of the second lip 56 is formed thick, the second lip 56 itself does not bend downward when the tip part is extended. Therefore, it is extremely excellent in workability.

Then, the second lip 56 is caused to climb over the lower fitting protrusion 37 of holder portion 31, then the second lip 56 abuts on a lower side of the lower fitting protrusion 37 of the holder portion 31, and when engaged with the fitting recess 34, the tip part abuts on the vicinity of a connecting portion between the fitting recess 34 and the lower fitting protrusion 37 of the holder portion 31. The abutting portion of the second lip 56 may be not only in the vicinity of the connecting portion between the fitting recess 34 and the lower fitting protrusion 37 but also on a lower portion of the fitting recess 34 or a side surface of the lower fitting protrusion 37 on the second panel 30 side.

At this time, since the side surface of the fitting protrusion 35 on the first panel 20 side abuts on the mounting base 51, the roof weather strip 50 can be firmly fixed to the holder portion 31 of the second panel 30 by abutment of the first lip 54, the second lip 56, and the mounting base 51 on the side surface of the fitting protrusion 35 on the first panel 20 side.

Therefore, the first panel 20 is blocked for a long period, the first panel edge portion 21 formed of polyurethane and the seal portion 52 of the roof weather strip 50 are fixed to an end portion of the first panel 20 on the second panel 30 side, when the first panel 20 is opened, that is, in FIG. 3, even when the first panel 20 moves in an arrow direction, by a high frictional force of the first lip 54 with both side surfaces of the fitting recess 34 of the holder portion 31, a strong abutting force of the second lip 56 in the vicinity of the connecting portion of the lower fitting protrusion 37 of the holder portion 31, and the like, and their synergistic effects, the mounting base 51 of the roof weather strip 50 is firmly fixed to the holder portion 31 against a fixing force with the first lip 54, so that the roof weather strip 50 can be prevented from disconnection.

Further, since both of the first lip 54 and the second lip 56 have a lip shape, a weight of the roof weather strip 50 is not increased.

Next, a second embodiment of the present invention will be described with reference to FIG. 4 and FIG. 5. The second embodiment is different from the first embodiment in that a recess 58 is formed in the mounting base 51.

Figure 4:
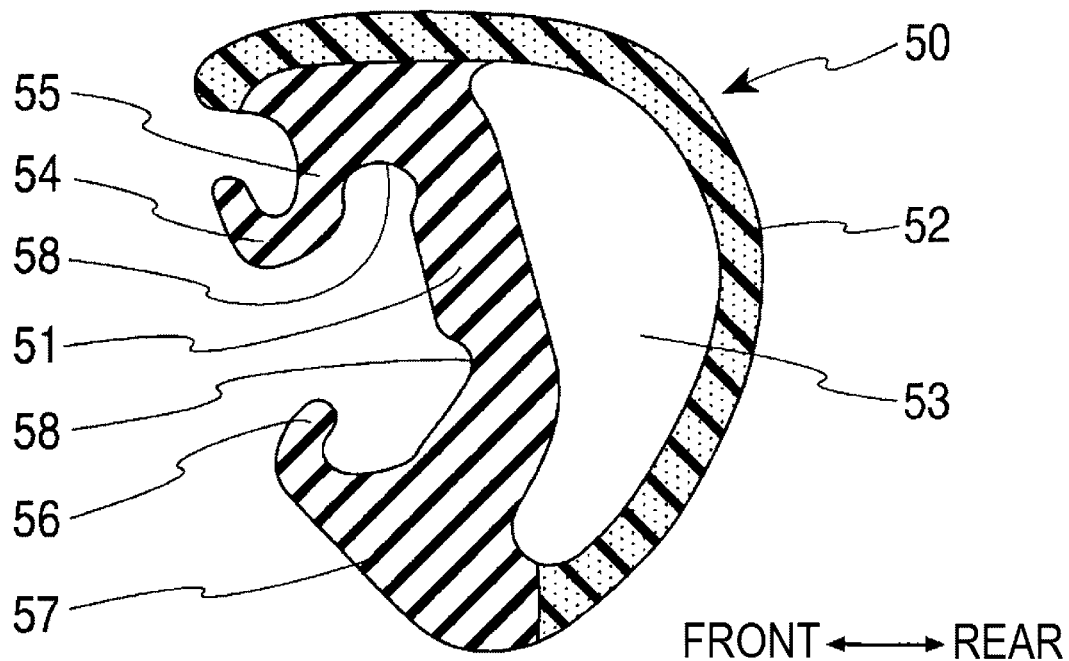
FIG. 4 is a cross-sectional view of a roof weather strip according to a second embodiment of the present invention.
Figure 5:
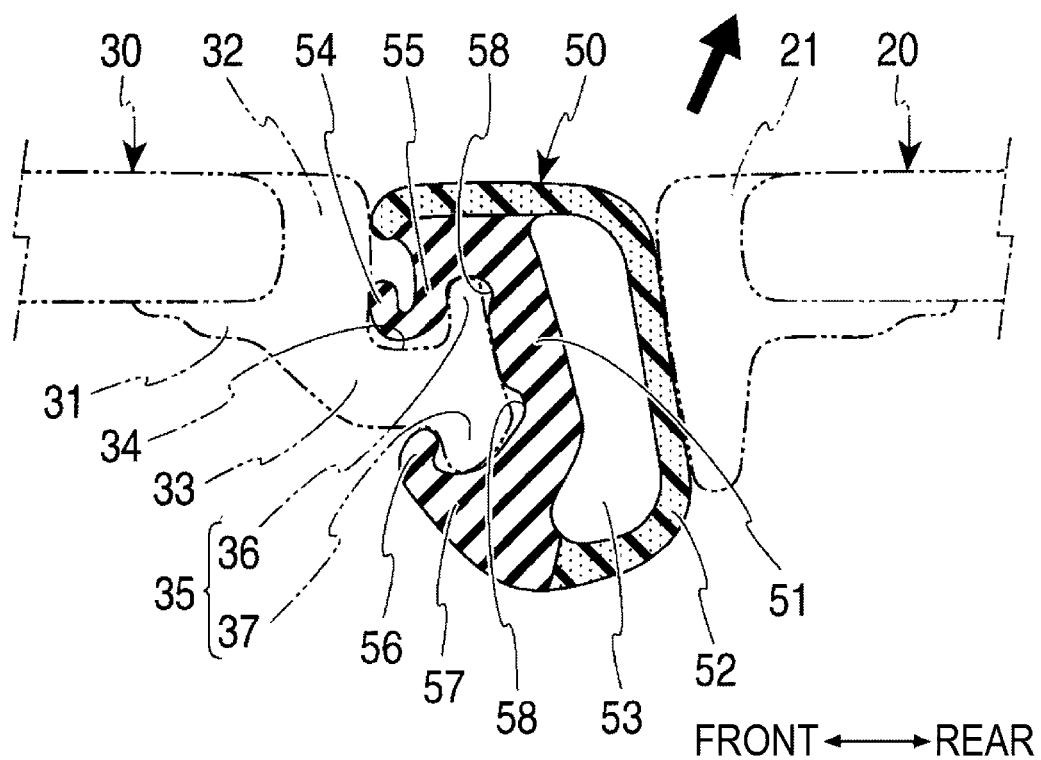
FIG. 5 is a cross-sectional view of a cross section A-A of the roof weather strip of FIG. 1 when the roof weather strip according to the second embodiment of the present invention is attached to the roof.
Figure 6:
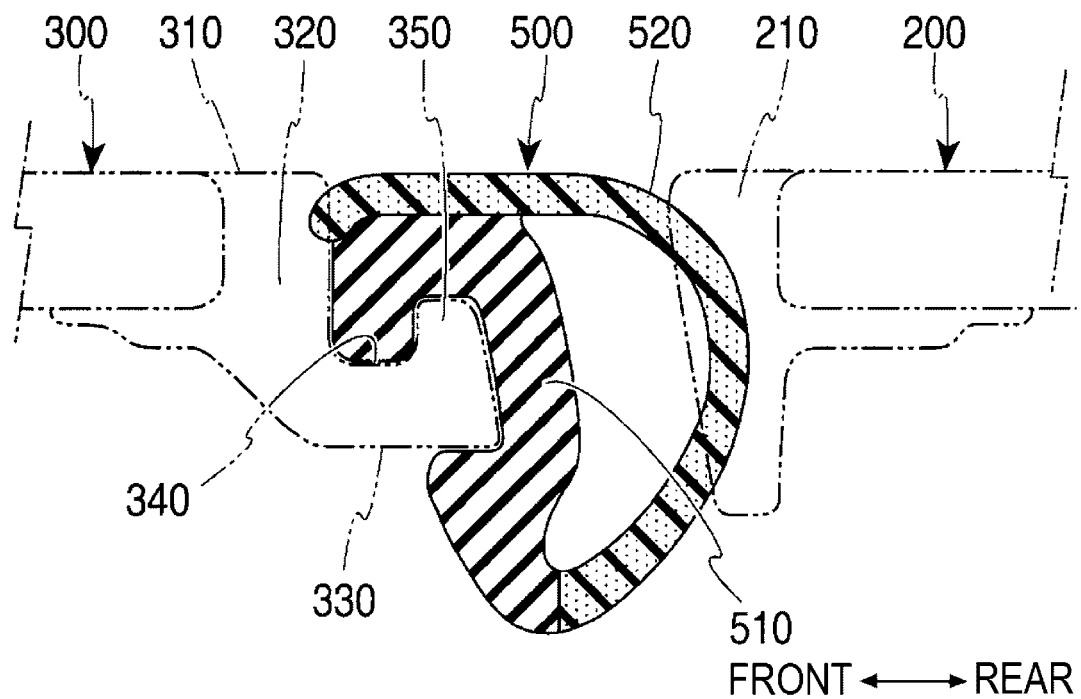
FIG. 6 is a cross-sectional view showing a related configuration.
Figure 7:
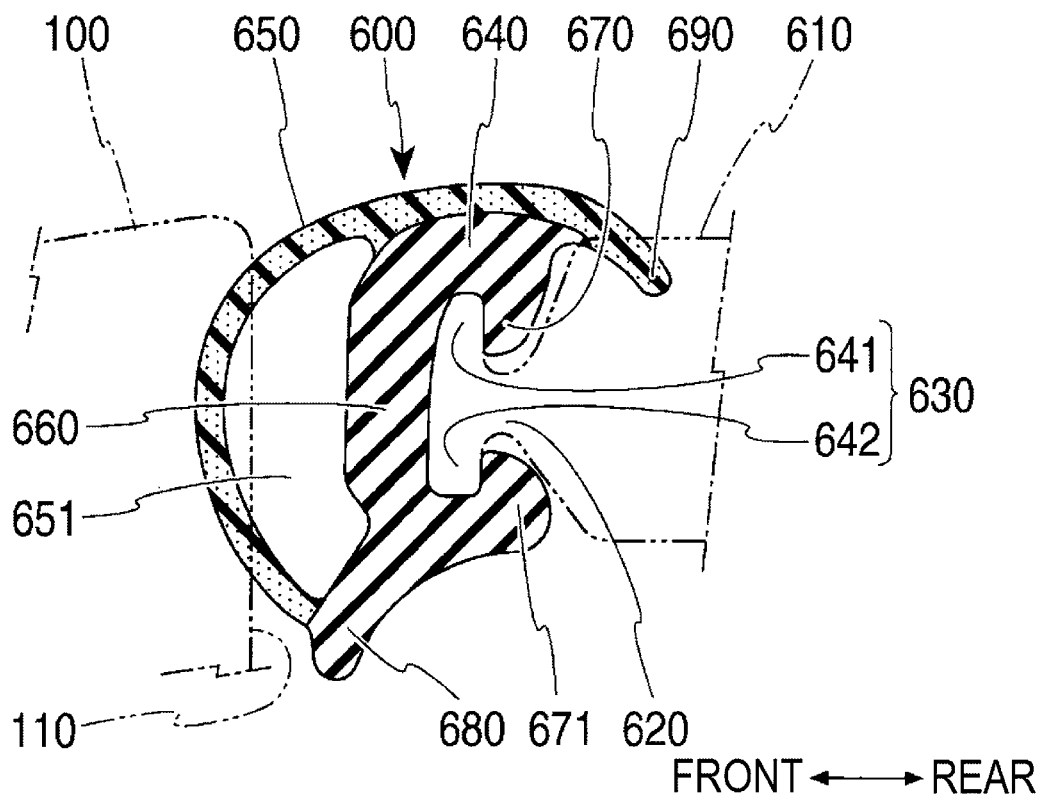
FIG. 7 is a cross-sectional view showing a related configuration.

As shown in FIG. 4, the recess 58 is formed in the mounting base 51 at an upper end portion and a lower end portion of a part abutting on the side surface of the fitting protrusion 35 of the holder portion 31 on the first panel 20 side. A case where the roof weather strip 50 is attached to holder portion 31 is shown in FIG. 5.

There is necessarily a dimensional error in the upper fitting protrusion 36 and the lower fitting protrusion 37 of the holder portion 31 and the mounting base 51 of the roof weather strip 50. As is clear from FIG. 5, by forming the recess 58, the recess 58 can absorb a dimensional error between the fitting protrusion 35 of the holder portion 31 and the roof weather strip 50, and the roof weather strip 50 can be certainly mounted on a predetermined position of the holder portion 31. Along with this, the assemblability is improved.

The recess 58 may be formed at only the upper end portion or only the lower end portion of the part of the mounting base 51 abutting on the side surface of the fitting protrusion 35 of the holder portion 31 on the first panel 20 side.

The implementation of the present invention is not limited to the embodiments described above, and various modifications can be made without departing from the object of the present invention.

In the roof weather strip 50, the mounting base 51, the first lip 54, and the second lip 56 are solid materials of EPDM (ethylene propylene diene rubber), and the seal portion 52 uses a sponge material of EPDM. However, the solid material and the sponge material of a thermoplastic elastomer such as an olefin thermoplastic elastomer (TPO) and a dynamically cross-linked thermoplastic elastomer (TPV)

may be used. A coating of a resin material (polyurethane) same as the first panel edge portion 21 may be formed on an outer side of the seal portion 52.

In the above configurations, a lower surface of the holder portion 31 becomes a same surface including the fitting recess 34 and a connecting portion of the fitting recess 34 and the lower fitting protrusion 37. However, the lower surface of the holder portion may be formed as a fitting recess constricted in the vehicle vertical direction, and a fitting protrusion including an upper fitting protrusion and a lower fitting protrusion connected to the fitting recess and protruding in the vehicle vertical direction may be formed.

What is claimed is:

1. A roof weather strip comprising:
   a first panel; and
   a second panel, wherein:
   the first panel is configured to be possible to open and close a opening portion of a vehicle roof;
   the second panel is disposed adjacent to a vehicle rear side or front side of the first panel and is fixed in a state of blocking the opening portion;
   a holder portion is formed on an end portion of the second panel on the first panel side,
   the holder portion is formed with a fitting recess in a direction of the first panel side, which is constricted in a vehicle height direction, and a fitting protrusion connected to the fitting recess, which includes an upper fitting protrusion and a lower fitting protrusion protruding in a vehicle vertical direction;
   the roof weather strip is mounted to the holder portion and seals a space between the holder portion and the first panel by inserting the upper fitting protrusion and the lower fitting protrusion of the holder portion in the vehicle height direction;
   the roof weather strip integrally includes:
   a mounting base; and
   a seal portion elastically contactable with an edge portion of the first panel;
   the mounting base includes:
   a first lip having a substantially J-shaped cross section, which covers the upper fitting protrusion of the holder portion from above the vehicle, extends downward of the vehicle, and abuts on at least both side surfaces of the fitting recess of the holder portion; and
   a second lip having a substantially transverse v-shaped cross section, which covers the lower fitting protrusion of the holder portion from below the vehicle, extends upward of the vehicle, and abuts on at least one of a lower surface of the fitting recess of the holder portion and a side surface of the lower fitting protrusion on the second panel side.

2. The roof weather strip according to claim 1, wherein a downward extension length of the first lip is set longer than an upward extension length of the second lip.

3. The roof weather strip according to claim 1, wherein a recess is formed on at least one of an upper end portion and a lower end portion of a surface abutting on a side surface of the fitting protrusion of the holder portion on the first panel side in the mounting base.

* * * * *